United States Patent
Easley

(10) Patent No.: US 6,829,411 B2
(45) Date of Patent: Dec. 7, 2004

(54) WIDE ANGLE LIGHT DIFFUSING OPTICAL FIBER TIP

(75) Inventor: James C. Easley, St. Charles, MO (US)

(73) Assignee: Syntec, Inc., Winfield, MO (US)

( * ) Notice: Subject to any disclaimer, the term of this patent is extended or adjusted under 35 U.S.C. 154(b) by 0 days.

(21) Appl. No.: 09/943,866

(22) Filed: Aug. 31, 2001

(65) Prior Publication Data

US 2002/0028041 A1 Mar. 7, 2002

Related U.S. Application Data

(60) Provisional application No. 60/229,880, filed on Sep. 1, 2000.

(51) Int. Cl.[7] ................................................. G02B 6/26
(52) U.S. Cl. ........................................................ 385/31
(58) Field of Search ............................... 385/31, 33, 35, 385/38, 901; 362/554, 556, 558, 559, 560

(56) References Cited

U.S. PATENT DOCUMENTS

| | | | |
|---|---|---|---|
| 3,626,040 A | * 12/1971 | Nagao et al. ............... 264/1.28 |
| 4,195,907 A | * 4/1980 | Zamja et al. ................ 385/125 |
| 4,466,697 A | 8/1984 | Daniel .......................... 385/123 |
| 5,269,777 A | 12/1993 | Doiron et al. .................. 606/7 |
| 5,351,168 A | 9/1994 | Easley .......................... 362/572 |
| 5,432,876 A | * 7/1995 | Appeldorn et al. ............ 385/31 |
| 5,530,780 A | * 6/1996 | Ohsawa ......................... 385/31 |
| 5,784,508 A | 7/1998 | Turner ........................... 385/31 |
| 5,807,390 A | 9/1998 | Fuller et al. ................... 606/17 |

* cited by examiner

*Primary Examiner*—Tulsidas C. Patel
(74) *Attorney, Agent, or Firm*—Polster Lieder Woodruff & Lucchesi, LC

(57) ABSTRACT

A diffusing optical fiber tip yielding a homogenous output pattern having a total illumination angle of at least 180 degrees. The diffusing optical fiber tip has an outer diameter which is no greater than that of the optical fiber, and appears as a point source of illumination, having substantially the same output pattern when immersed in water as it does in air. The diffusing optical fiber tip is manufactured on the end of a typical acrylic optical fiber by causing longitudinal stresses in the fiber end, which are then relieved by forming axial cracks in the fiber core at the optical fiber tip. As a result, light exiting the optical fiber must traverse a scrambled pathway caused by a complex interaction of reflections and refractions, yielding wide angle diffuse illumination.

12 Claims, 2 Drawing Sheets

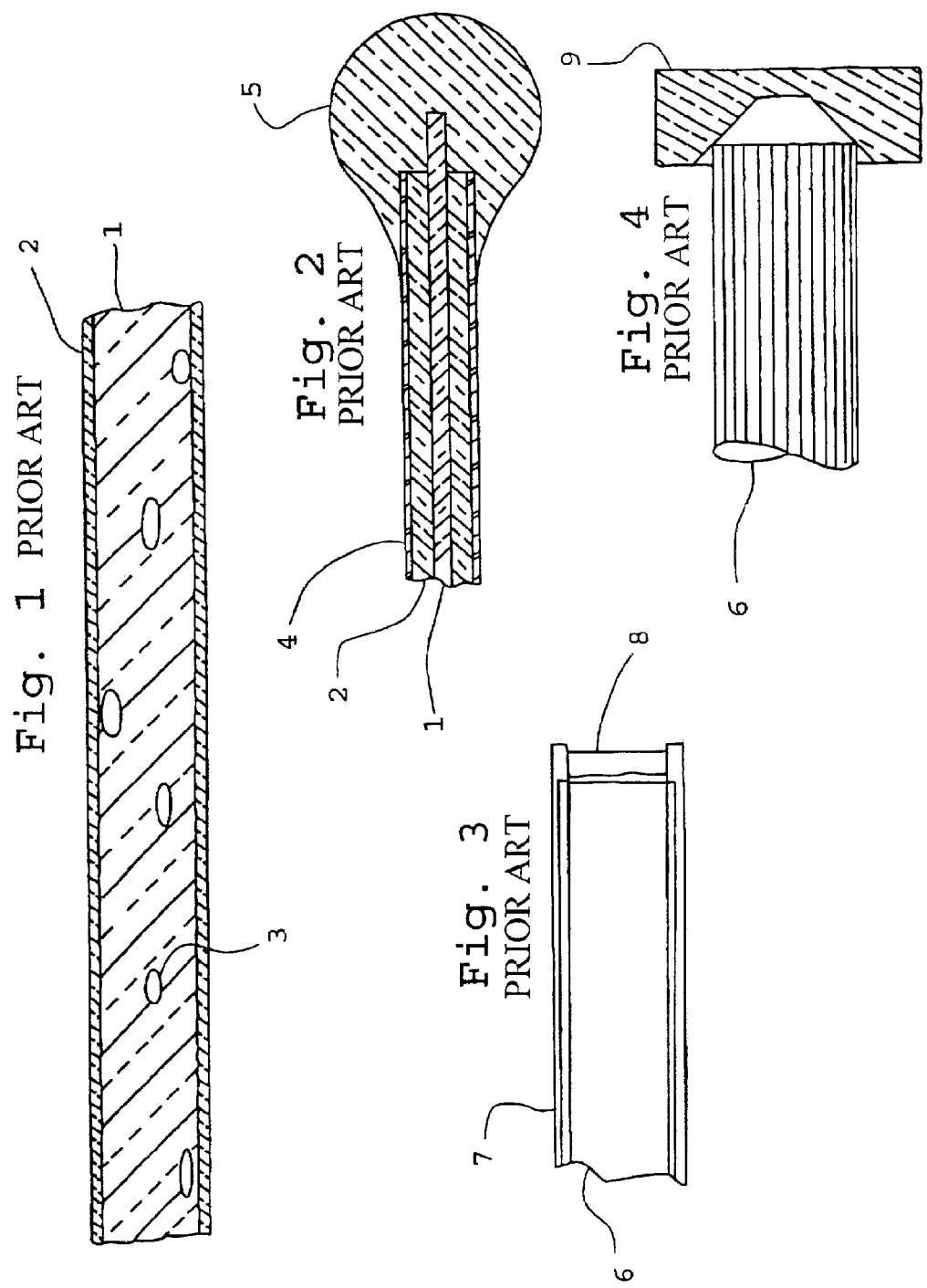

WIDE ANGLE LIGHT DIFFUSING OPTICAL FIBER TIP

CROSS-REFERENCE TO RELATED APPLICATIONS

This application claims priority over the Provisional Ser. No. 60/229,880, filed on Sep. 1, 2000.

STATEMENT REGARDING FEDERALLY SPONSORED RESEARCH OR DEVELOPMENT

Not Applicable.

BACKGROUND OF THE INVENTION

The present invention relates to fiber optic illumination devices. In particular, illuminations device that are required to provide illumination over a large angular area compared to normal fiber optic output apertures.

Optical fibers are useful for conducting light from a light source to a remote site. Areas may be conveniently illuminated that are too small for the light source, contain explosion hazards, which are inconvenient to service and which are otherwise unsuitable for conventional lighting sources. Optical fibers are used extensively in medical applications, for microsurgery, endoscopic surgery, and photodynamic therapy. Additionally, optical fibers are used in industrial and commercial applications for inspections, as decoration, and for general illumination purposes. Optical fibers have also been used to conduct sunlight from the exterior of a building to interior rooms to provide natural lighting, and as indicator or pathway lighting in confined spaces.

A normal optical fiber is cylindrically shaped and relatively long compared to its diameter. Optical fibers are manufactured with a light transmitting material having a relatively high index of refraction. Most often, it is coated with a material having a lower index of refraction. The central material of the optical fiber is referred to as the core, and the coating material is known as the cladding. Light which is traveling within the core of the fiber will eventually impinge on the core/cladding interface. If the intersection angle is narrow enough, as determined by the ratio of the cladding index of refraction to the core index of refraction), the light will be entirely reflected back into the core. Light intersecting the interface at an angle which exceeds this "critical angle" escapes from the optical fiber through the cladding material. An optical fiber will only accept light within a certain angle range. Output light will exit the normal optical fiber in a relatively narrow cone shaped pattern. The included angle of the cone of exiting light is generally 60 degrees or less.

For many potential applications of an optical fiber for illumination purposes, the limitation of the output angle is a great disadvantage. In order to illuminate a desired area entirely, it is often necessary to space the fiber a distance from the area or illuminate the area with multiple fibers pointed in several different directions. Either solution is may be impractical or expensive. Accordingly, various methods have been utilized to overcome this disadvantage by increasing the illumination angle of light available from an optical fiber. One method is to simply roughen the surface of the core material. This causes the relative angle of incidence of the light at the core/cladding interface to change, and additional light to correspondingly leak out of the cladding. This method requires the use of a great length of fiber, otherwise a majority of the light still exits the optical fiber from the end in a normal manner. Another method illustrated in FIG. 1 is to modify the optical fiber core 1, but not the cladding 2, to include bubbles 3 or other internal structural configuration which interfere with the light pathways, such as is disclosed in U.S. Pat. No. 4,466,697 to Daniel and U.S. Pat. No. 4,195,907 to Zamja et al., both herein incorporated by reference. The light traveling in the core 1 refracts and reflects off of the bubbles 3, again altering the angle of incidence of the light at the core/cladding interface, and causing additional light to escape through the cladding 2. However, it is difficult to control the density and size of the bubbles.

An alternative technique is to apply a material containing bubbles to the tip of the optical fiber. If the bubbles are homogenous, then the light scattering is greatest near the tip of the optical fiber. However, because there is less light to scatter, the intensity of the output reduces with the distance from the top of the optical fiber. Additionally, manufacturing this type of optical diffusing tip is expensive and inconsistent.

An additional alternative technique shown in FIG. 2 is to mix a light scattering and/or reflecting medium 5, usually a powder in a transparent carrier material, which is then applied to the tip of the optical fibers, or to an exposed portion of the core using various conventional methods. Such a technique and diffuser is shown in U.S. Pat. No. 5,269,777 to Doiron et al. Alternatively, a tip portion for attachment to the end of an optical fiber may be provided which consists of a light propagating material having inclusions distributed therein for interacting with the light exiting the optical fiber to produce a predetermined light distribution, such as is shown in U.S. Pat. No. 5,807,390 to Fuller et al. and herein incorporated by reference. As with the previously described techniques, these techniques suffer from the problems of reduced output pattern, control difficulties, expense, and size, as well as the difficulty of attaching the tip portion to the optical fiber end.

Several other techniques seek to utilize a separate optical element located near or on the optical fiber tip to refract light exiting the optical fiber tip. For example, as seen in FIGS. 3 through 5, disks 8 with holographic microlenses, frusto-conic lenses 9, and spherical lenses 11 such as shown in U.S. Pat. No. 5,784,508 to Turner, have been utilized in this manner. Each of these methods is limited in the amount of light dispersion which they are capable of providing (typically, no more than 120 degrees of total output angle from the optical fiber tip). Light exiting the optical fiber is refracted differently by the lens 9 depending upon the area of the lens which it impinges upon. The angular distribution of the light affected by the two areas of the lens 9 is tailored to overlap, yielding an even illumination level over the entire output of the lens. Additionally, the inclusion of separate optical elements add to the complexity and expense of manufacture due to the added optical element and the architecture required to support it.

As seen in FIG. 6, optical elements have even been manufactured directly into the end of the optical fibers by providing a faceted end surface 13 with a reflective coating. This results in the output light bending away from its normal illumination pattern, but the new patterns remain inconsistent.

Finally, as illustrated in FIG. 7, methods to disperse the output light from optical fibers have attempted to modify the end of the optical fibers in a "bullet" shape 14 configured to cause both reflection and refraction of the exiting light, yielding a nearly ideal output angle of 180 degrees or more near the point of the bullet shape 14 without resulting in light and dark areas. One such configuration is disclosed in U.S. Pat. No. 5,351,168 to Easley, herein incorporated by reference. However, the bullet shape of the optical fiber end is difficult to manufacture, and must be nearly perfect to achieve the desired illumination pattern, with any deviations resulting in patterns of light and dark rings.

BRIEF SUMMARY OF THE INVENTION

Briefly stated, the present invention provides a diffusing optical fiber tip yielding a homogenous output pattern having a total illumination angle of at least 180 degrees. The diffusing optical fiber tip has an outer diameter which is no greater than that of the optical fiber, and appears as a point source of illumination, having substantially the same output pattern when immersed in water as it does in air. The diffusing optical fiber tip is manufactured on the end of a typical acrylic optical fiber by causing longitudinal stresses in the fiber end, which are then relieved by forming axial cracks or inclusions in the fiber core at the optical fiber tip. As a result, light exiting the optical fiber must traverse a scrambled pathway caused by a complex interaction of reflections and refractions. The diffusing optical fiber tip of the present invention is inexpensive to manufacture, and requires no additional assemblies to be secured to the end of the optical fibers.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a section representation of a prior art optical fiber device using bubbles in the core material to scatter light;

FIG. 2 is a section representation of a prior art device using a light scattering medium secured to the optical fiber tip;

FIG. 3 is a schematic representation of a prior art device using a light scattering disk located near the optical fiber tip;

FIG. 4 is a schematic sectional representation of a prior art device using a frustoconic lens located near the optical fiber tip;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

The term "substantially" as used herein is understood to mean "within a predetermined amount or tolerance", and is not limited to an exact amount or value. The term "light" as used generically herein in is understood to mean any emissions in the optical spectrum, including, but not limited to, infrared, visible, and ultraviolet wavelengths. Monochromatic, polychromatic, and filtered light is understood to be covered within the scope of the term "light" as used herein.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

Figure 7:
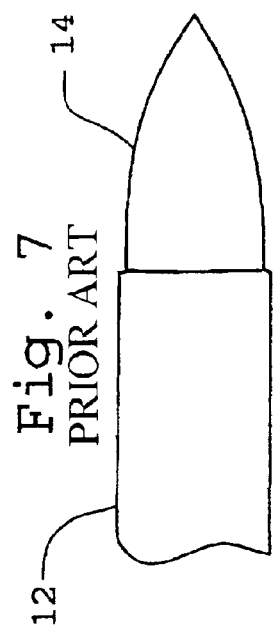
FIG. 7 is a schematic representation of a prior art device using a "bullet" shaped optical fiber tip.
Figure 8:
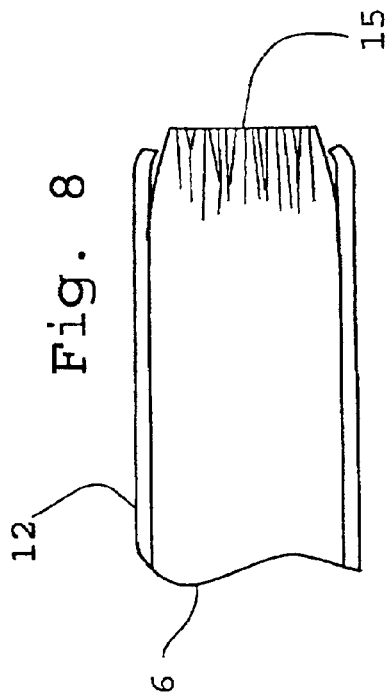
FIG. 8 is a schematic representation of the present invention for use as an illuminator in ophthalmic surgery.
Figure 5:
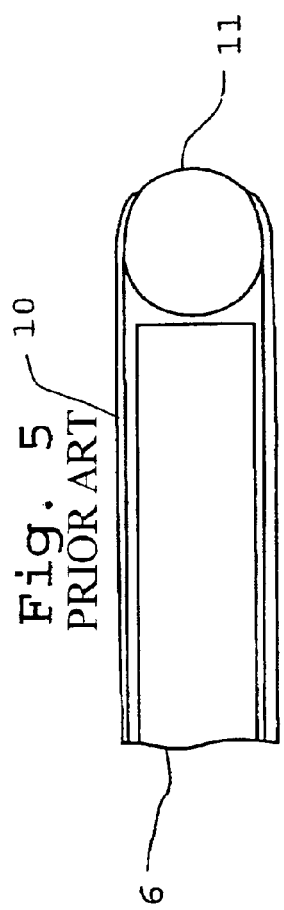
FIG. 5 is a schematic representation of a prior art device using a spherical lens located near the optical fiber tip.
Figure 6:
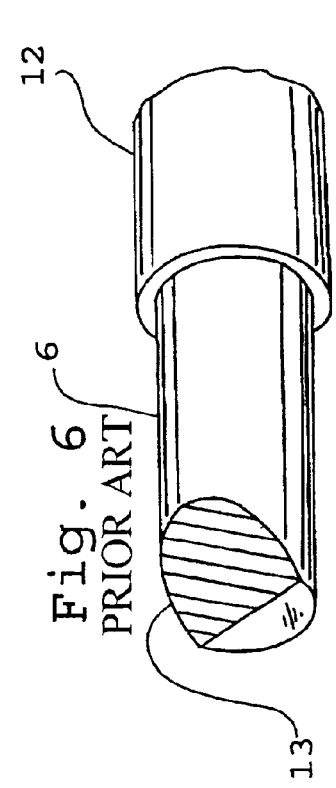
FIG. 6 is a perspective representation of a prior art device using a faceted optical fiber tip.

Turning to FIG. 8, a preferred embodiment of the present invention for use as an illuminator in ophthalmic surgery is shown. An optical fiber 6, having a core and a cladding of light transmissive materials is constructed as is known in the prior art, preferably from an acrylic plastic or other suitable optical medium such as glass. In one embodiment, particularly suitable for medical applications, the optical fiber is protected by a metal tube 12 formed from stainless steel or other suitable protective material. In alternative embodiments, the metal tube 12 may be eliminated, and the optical fiber left exposed. The exposed end of the optical fiber 6 incorporates a number of cracks 15 or inclusions in the core material, orientated generally parallel to the longitudinal axis of the optical fiber 6. Light exiting the optical fiber 6 encounters the cracks 15 or inclusions, and is deflected multiple times through a complex combination of reflections and refractions.

The desired light distribution pattern from the exposed end of the optical fiber 6 is controlled by the length of the cracks 15 formed in the core material. Very short cracks 15 or "bristles" which are substantially half as long as the diameter of the optical fiber 6, yield an output pattern of light from the optical fiber 6 which is more intense along the longitudinal axis of the optical fiber, with the intensity decreasing gradually to a minimum at substantially 90 degrees relative to the longitudinal axis of the optical fiber. Longer cracks 15 or "bristles", substantially twice as long as the diameter of the optical fiber 6, yield an output pattern which is almost dark along the longitudinal axis of the optical fiber, with intensity increasing in proportion to the angle from the longitudinal axis to substantially 45 degrees. From substantially 45 degrees to the longitudinal axis of the optical fiber to substantially 90 degrees thereto, the intensity of the light exiting the optical fiber 6 is substantially the same. At a length between short and long, the output pattern of light exiting the optical fiber 6 is substantially homogeneous from the longitudinal axis of the optical fiber to a 90 degree dispersion, i.e. 180 degrees of total light dispersion from the optical fiber end.

One suitable method for forming cracks 15 into the optical fiber 6 is based upon the use of an acrylic material as the core. Axial or longitudinal stresses result from the heating of the fiber to the material softening point followed by the placement of a tensioning stress on the optical fiber 6, resulting in a slight reduction in the outer diameter of the optical fiber 6. The heat is next removed from the optical fiber 6, and the tension maintained. Squeezing or compressing the fiber along the reduced diameter portion causes a stress relieve in the core material in the form of cracks 15.

An alternative method of stress relief in the stress induced optical fiber 6 would be to exposed the stressed portion having a reduced outer diameter to an organic solvent, such as alcohol.

Those of ordinary skill in the art will readily recognize that the method for forming cracks 15 in the optical fiber 6 will vary depending upon the specific optical material utilized in the core of the optical fiber 6. Accordingly, different techniques for inducing stress in the optical fiber 6 which result in the formation of cracks 15 as a form of stress relief are considered to be within the scope of this invention. Furthermore, while the invention has been described above in an embodiment suitable for illumination purposes in ophthalmic surgery, it is not intended to be limited to such applications. Rather, it will be readily appreciated that a variety of simple wide-angle illumination devices are useful in many medical, industrial, and commercial areas, and that optical fibers 6 incorporating the light dispersing ends of the present invention may be utilized in combination with a wide variety of devices, such as cannulas, scissors, foreceps, endoscopes, etc.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An improved illumination device including an optical fiber for directing light from a light source located adjacent a first end of the optical fiber to a second end of the optical fiber, the optical fiber having a longitudinal axis, the improvement comprising:
    a light diffuser disposed at said second end of the optical fiber, said light diffuser including a plurality of cracks formed and arranged generally parallel to the longitudinal axis of the optical fiber.

2. An improved optical fiber having first and second ends, comprising an inner core of optical material having a first index of refraction and an outer layer of cladding having a second index of refraction radially surrounding said inner core, wherein said improvement comprises a light diffuser incorporated into a least one end of said optical fiber, said light diffuser including a plurality of cracks formed along said at least one end to provide a homogenous output pattern having a total illumination angle of at least one hundred eighty degrees.

3. The improved optical fiber of claim 2 wherein said plurality of cracks is longitudinally disposed along said at least one end of said optical fiber.

4. The improved optical fiber of claim 3 wherein said plurality of cracks are of substantially uniform length, said length ranging between one half and twice the outer diameter of said optical fiber.

5. The improved optical fiber of claim 3 wherein said inner core of optical material is composed of an acrylic plastic.

6. A method for forming a wide angle light diffuser into an end of an optical fiber having a core and a cladding, comprising the steps of:
    applying a tension force to said optical fiber adjacent at said end, said tension force increasing stress in said optical fiber core; and
    forming a plurality of substantially longitudinal cracks in said stressed optical fiber core to reduce stress in said optical fiber core while maintaining said tension force on said optical fiber, to form a diffusing optical fiber tip having an outer diameter that is no greater than the diameter of the optical fiber, said plurality of substantially longitudinal cracks diffusing light exiting said optical fiber at said end so as to provide a homogenous output pattern.

7. The method of claim 6 for forming a wide angle light diffuser into an end of an optical fiber further including the steps of:
    heating said optical fiber to a softening point prior to applying said tension force; and
    cooling said optical fiber prior to forming said plurality of substantially longitudinal cracks in said stressed optical fiber core.

8. The method of claim 6 for forming a wide angle light diffuser into an end of an optical fiber wherein the step of forming said plurality of substantially longitudinal cracks includes the application of a compressive force to said stressed optical fiber at said end.

9. The method of claim 6 for forming a wide angle light diffuser into an end of an optical fiber wherein the step of applying a tension force to said optical fiber results in a reduction in an outer diameter of said optical fiber at said end.

10. The method of claim 6 for forming a wide angle light diffuser into an end of an optical fiber wherein said optical fiber core is composed of acrylic.

11. The method of claim 6 for forming a wide angle light diffuser into an end of an optical fiber wherein the step of forming said plurality of substantially longitudinal cracks includes exposing said stressed optical fiber end to an organic solvent.

12. The method of claim 11 for forming a wide angle light diffuser into an end of an optical fiber wherein said organic solvent is alcohol.

* * * * *